United States Patent
Zou

(10) Patent No.: US 8,356,133 B2
(45) Date of Patent: Jan. 15, 2013

(54) TOUCH MODULE SWITCH CIRCUIT FOR ALL IN ONE COMPUTER

(75) Inventor: Teng-Feng Zou, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 256 days.

(21) Appl. No.: 12/980,342

(22) Filed: Dec. 29, 2010

(65) Prior Publication Data

US 2012/0151114 A1    Jun. 14, 2012

(30) Foreign Application Priority Data

Dec. 9, 2010    (TW) .................................. 99143025

(51) Int. Cl.
  *G06F 13/00* (2006.01)

(52) U.S. Cl. ......................................... 710/316; 710/62

(58) Field of Classification Search .......... 710/313–317, 710/62–64, 72–74
See application file for complete search history.

(56) References Cited

U.S. PATENT DOCUMENTS

| | | | |
|---|---|---|---|
| 2008/0183909 A1* | 7/2008 | Lim et al. ......................... | 710/14 |
| 2010/0161839 A1* | 6/2010 | Fontana et al. .................. | 710/10 |
| 2010/0185785 A1* | 7/2010 | Wu et al. ......................... | 710/11 |

* cited by examiner

*Primary Examiner* — Raymond Phan
(74) *Attorney, Agent, or Firm* — Altis Law Group, Inc.

(57) ABSTRACT

A touch module switch circuit includes a universal serial bus (USB) display circuit, a touch module, a first resistor, a second resistor, a first diode, a second diode, a USB switch chip, and a USB interface. The touch module selectively communicates with one of the USB display circuits and the USB interface by control of the USB switch chip together with the first resistor, the second resistor, the first diode, and the second diode.

3 Claims, 1 Drawing Sheet

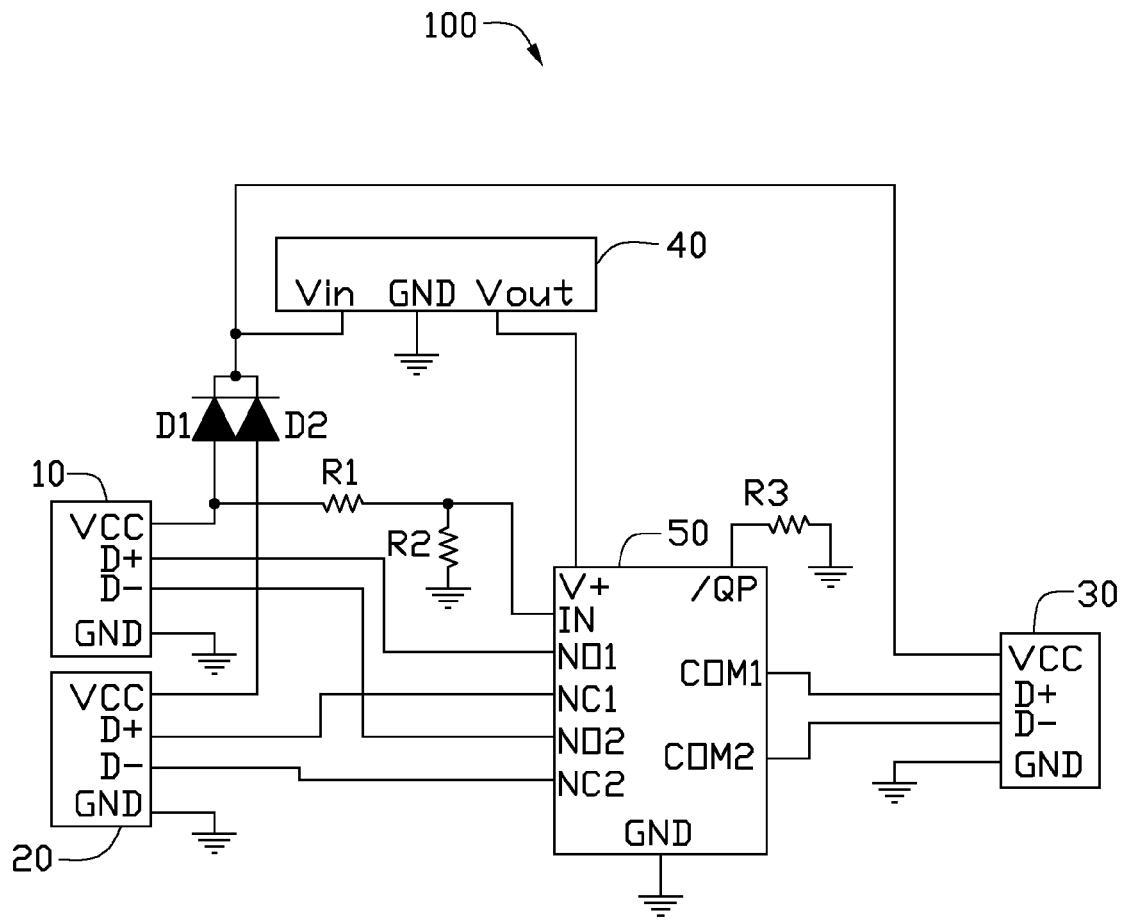

TOUCH MODULE SWITCH CIRCUIT FOR ALL IN ONE COMPUTER

BACKGROUND

1. Technical Field

The present disclosure relates to a touch module switch circuit of an all in one (AIO) computer.

2. Description of Related Art

AIO computers are more and more popular in our life. A frame of an AIO computer looks like a common liquid crystal display (LCD). However, the AIO computer display cannot be a display for other common desktop computers. Therefore, there is room for improvement in the art.

BRIEF DESCRIPTION OF THE DRAWING

Many aspects of the present embodiments can be better understood with reference to the following drawing. The components in the drawings are not necessarily drawn to scale, the emphasis instead being placed upon clearly illustrating the principles of the present embodiments.

The drawing is a circuit diagram of an embodiment of a touch module switch circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the drawing, an embodiment of a touch module switch circuit 100 is used in an all in one (AIO) computer, to switch the AIO computer to be a display for a common desktop computer or a notebook computer. The touch module switch circuit 100 includes a universal serial bus (USB) display circuit 20 and a touch module 30. The USB display circuit 20 and the touch module 30 each include four USB pins, which are respectively a power pin VCC, two data pins D+ and D−, and a ground pin GND. When the power pin VCC, data pins D+ and D−, ground pin GND of the USB display circuit 20 are respectively connected to the power pin VCC, data pins D+ and D−, ground pin GND of the touch module 30, the AIO computer can be operated by the touch module 30. The USB display circuit 20 and the touch module 30 fall within well-known technologies, and therefore are not described here.

The touch module switch circuit 100 further includes a USB interface 10, a first diode D1, a second diode D2, a voltage convertor 40, a USB switch chip 50, and three resistors R1-R3. In one embodiment, the USB switch chip 50 is an MAX4906EF USB switch chip which includes an input terminal IN, an enable terminal /OP, a voltage terminal V+, a ground terminal GND, a first switch input terminal NO1, a second switch input terminal NC1, a third switch input terminal NO2, a fourth switch input terminal NC2, a first switch output terminal COM1, and a second switch output terminal COM2. When the enable terminal /OP is in a low voltage state, such as 0 volts (V), the USB switch chip 50 is in working state. In working state, if the input terminal IN is in a high voltage state, such as 5V, the first switch input terminal NO1 is electrically connected to the first switch output terminal COM1, and the third switch input terminal NO2 is electrically connected to the second switch output terminal COM2. If the input terminal IN is in a low voltage state, the second switch input terminal NC1 is electrically connected to the first switch output terminal COM1, and the fourth switch input terminal NC2 is electrically connected to the second switch output terminal COM2.

The USB interface 10 includes a power pin VCC, two data pins D+ and D−, a ground pin GND. The power pin VCC of the USB interface 10 is connected to an anode of the first diode D1, and connected to the input terminal IN of the USB switch chip 50 though the resistor R1. The input terminal IN of the USB switch chip 50 is grounded through the resistor R2. A cathode of the first diode D1 is connected to an input pin Vin of the voltage convertor 40 and the power pin VCC of the touch module 30. A ground pin GND of the voltage convertor 40 is grounded. An output pin Vout of the voltage convertor 40 is connected to the voltage terminal V+ of the USB switch chip 50.

The data pins D+ and D− of the USB interface 10 are respectively connected to the first switch input terminal NO1 and the third switch input terminal NO2 of the USB switch chip 50. An anode of the second diode D2 is connected to the power pin VCC of the USB display circuit 20. A cathode of the second diode D2 is connected to the cathode of the first diode D1. The data pins D+ and D− of the USB display circuit 20 are respectively connected to the second switch input terminal NC1 and the fourth switch input terminal NC2 of the USB switch chip 50. The ground pin GND of the USB display circuit 20 is grounded. The first switch output terminal COM1 and the second switch output terminal COM2 of the USB switch chip 50 are respectively connected to the data pins D+ and D− of the touch module 30. The enable pin /OP of the USB switch chip 50 is grounded through the resistor R3.

In one embodiment, the voltage convertor 40 is used to convert 5V voltage from the power pin VCC of the USB interface 10 to 3.3V voltage to the voltage terminal V+ of the USB switch chip 50. In other embodiments, if the USB switch chip 50 needs 5V voltage, the voltage convertor 40 can be omitted for reducing costs. In one embodiment, a resistance range of the resistor R1 is about 100 kilohms (KΩ) to about 1 megohms, a resistance of the resistor R2 is twice as the resistance of the resistor R1, and a resistance range of the resistor R3 is about 1 KΩ to about 10 KΩ.

In use, when the USB interface 10 is not connected to an external computer, the input terminal IN of the USB switch chip 50 is in the low voltage state. Therefore, the second switch input terminal NC1 is electrically connected to the first switch output terminal COM1, and the fourth switch input terminal NC2 is electrically connected to the second switch output terminal COM2, namely the AIO computer display functions as the display for the AIO computer.

When the AIO computer needs to be used as a display for an external computer, the USB interface 10 is connected to the external computer, the input terminal IN of the USB switch chip 50 is in the high voltage state. Therefore, the first switch input terminal NO1 is electrically connected to the first switch output terminal COM1, and the third switch input terminal NO2 is electrically connected to the second switch output terminal COM2, namely the external computer can communicate with the touch module 30, and the touch module 30 functions as a display, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A touch module switch circuit comprising:
a universal serial bus (USB) display circuit and a touch module each comprising a power pin, two data pins, and a ground pin;
a first resistor and a second resistor;
a first diode and a second diode each comprising an anode and a cathode;
a USB switch chip comprising an input terminal, a voltage terminal, first to fourth switch input terminals, and first and second switch output terminals; and
a USB interface comprising a power pin, two data pins, and a ground pin;
wherein the power pin of the USB interface is connected to the anode of the first diode and connected to the input terminal of the USB switch chip through the first resistor, the input terminal of the USB switch chip is grounded through the second resistor, the cathode of the first diode is connected to the voltage terminal of the USB switch chip and the power pin of the touch module, the data pins of the USB interface are respectively connected to the first and third switch input terminals of the USB switch chip, the anode of the second diode is connected to the power pin of the USB display circuit, the cathode of the second diode is connected to the cathode of the first diode, the data pins of the USB display circuit are respectively connected to the second and fourth switch input terminals of the USB switch chip, the first and second switch output terminals of the USB switch chip are respectively connected to the data pins of the touch module; and
wherein the first switch input terminal is electrically connected to the first switch output terminal and the third switch input terminal is electrically connected to the second switch output terminal in response to the input terminal of the USB switch chip being in a high voltage state, the second switch input terminal is electrically connected to the first switch output terminal and the fourth switch input terminal is electrically connected to the second switch output terminal in response to the input terminal of the USB switch chip being in a low voltage state.

2. The touch module switch circuit of claim 1, further comprising a voltage converter connected between the cathode of the first diode and the voltage terminal of the USB switch chip.

3. The touch module switch circuit of claim 1, wherein a range of a resistance of the first resistor is about 100 kilohms to about-1 megohms, a resistance of the second resistor is twice as the resistance of the first resistor.

* * * * *